Jan. 9, 1940.    R. M. RANEY    2,186,148
STORAGE BATTERY
Filed Sept. 14, 1937    4 Sheets-Sheet 1
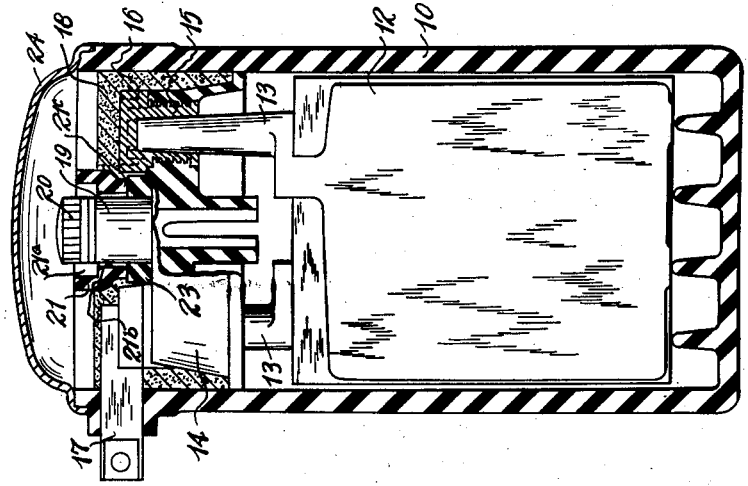
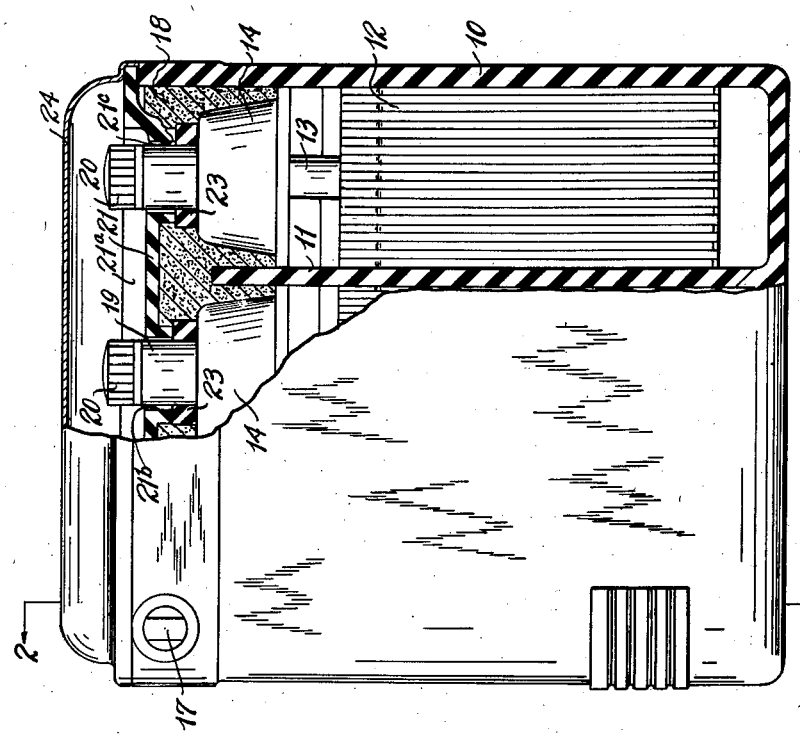
INVENTOR.
ROBERT M. RANEY
BY
Kwis, Hudson & Kent
ATTORNEYS Jan. 9, 1940.   R. M. RANEY   2,186,148
STORAGE BATTERY
Filed Sept. 14, 1937   4 Sheets-Sheet 2

INVENTOR.
ROBERT M. RANEY
BY
Kwis Hudson & Kent
ATTORNEYS

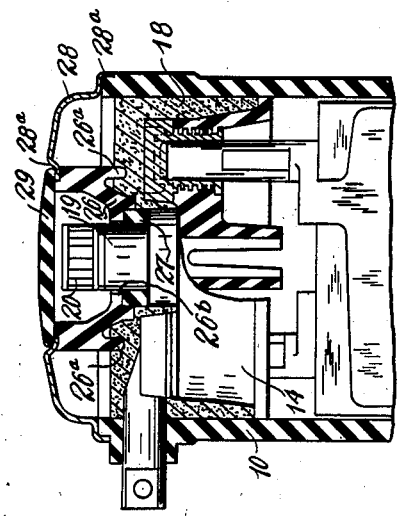
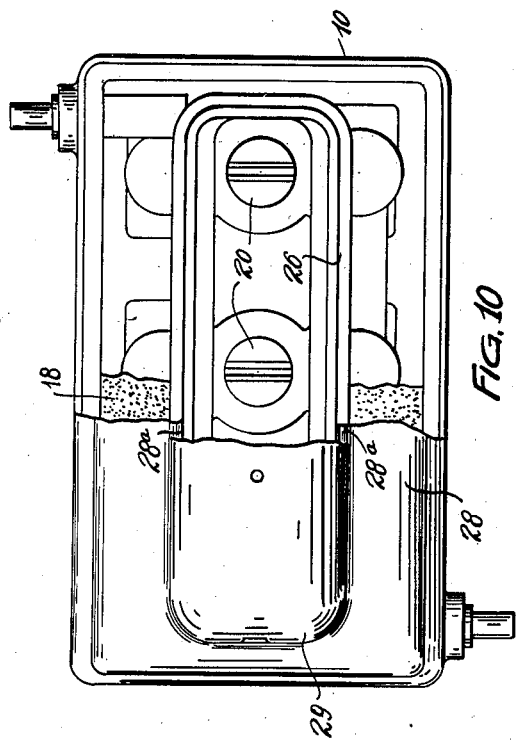
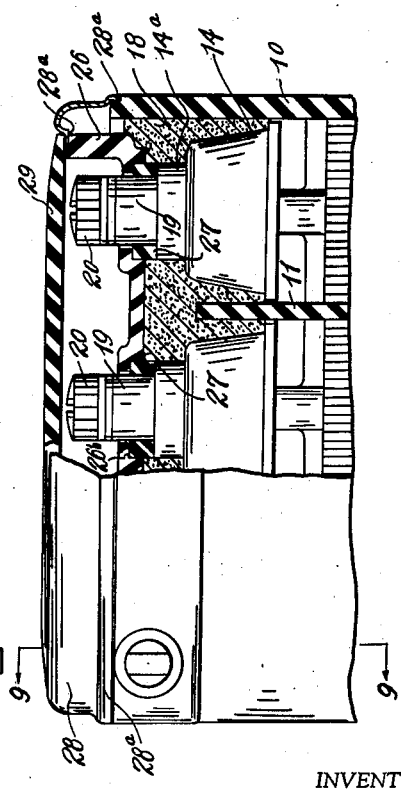

Jan. 9, 1940.   R. M. RANEY   2,186,148
STORAGE BATTERY
Filed Sept. 14, 1937   4 Sheets-Sheet 4

INVENTOR.
ROBERT M. RANEY
BY
Kwis Hudson & Kent
ATTORNEYS

Patented Jan. 9, 1940

2,186,148

UNITED STATES PATENT OFFICE 2,186,148

STORAGE BATTERY

Robert M. Raney, Euclid, Ohio, assignor to Willard Storage Battery Company, Cleveland, Ohio, a corporation of West Virginia Application September 14, 1937, Serial No. 163,756

3 Claims. (Cl. 136—170)

This invention relates to storage batteries, and has for its chief object to provide an improved holddown for the cover or covers of a battery and the battery element or elements associated therewith.

The present invention is not confined to a battery for any particular purpose but finds especial utility in connection with motorcycle batteries wherein the covers, the posts, and the connectors are desirably covered with a sealing compound to avoid short-circuits due to the presence of electrolyte on top of the battery. My invention is especially useful in a battery of this kind for the member which holds down the cover or covers and therefore the battery elements attached thereto may be in the form of an open top shallow receptacle extending across the battery (across the different cells of a multi-cell battery), and this holddown member may be provided with openings to receive the vent sleeves which extend upwardly from the cell covers so as to isolate the venting means and catch any electrolyte which runs out of the vent openings of the vent plugs.

This type of battery preferably has a depressed top to form a receptacle for the sealing compound and the whole is preferably covered by an auxiliary one-piece cover which may be held in place on top of the battery case by any suitable means, such as a holddown strap or a bracket of the motorcycle, which may be used therefore to press the holddown member down against the covers or preferably against cushioning and sealing means provided between the covers and the holddown member.

The invention may be further briefly summarized as consisting in certain details of construction and combinations and arrangements of parts which will be described in the specification and set forth in the appended claims.

In the accompanying sheets of drawings,

Fig. 1 is a view partly in elevation and partly in longitudinal section of a battery embodying my invention;

Fig. 2 is a transverse sectional view of the same substantially along the line 2—2 of Fig. 1;

Figure 3:
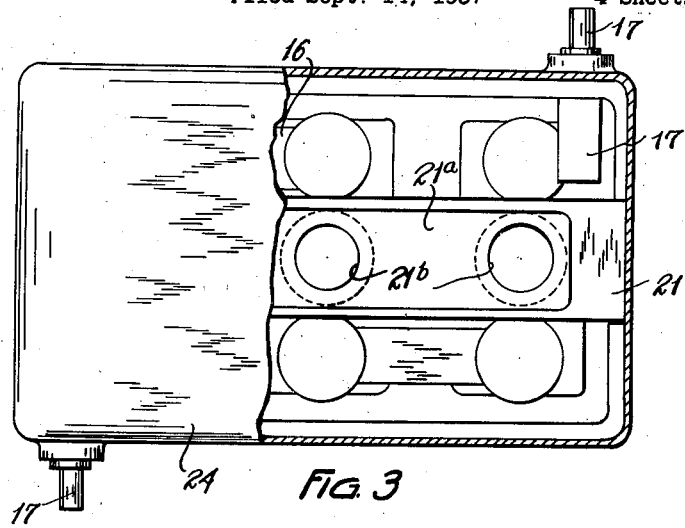
Fig. 3 is a top plan view of the same with a portion of the upper cover removed.
Figure 4:
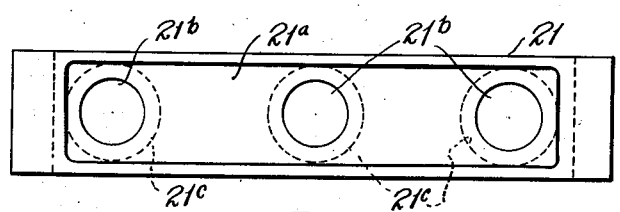
Figs. 4 and 5 are, respectively, a top plan view and a longitudinal sectional view of the holddown frame or receptacle.
Figure 5:
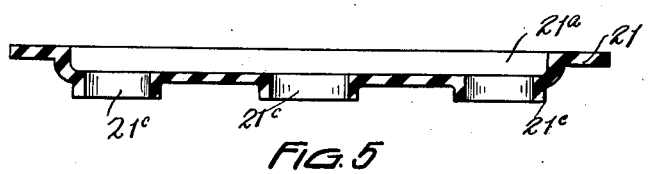
Figure 12:
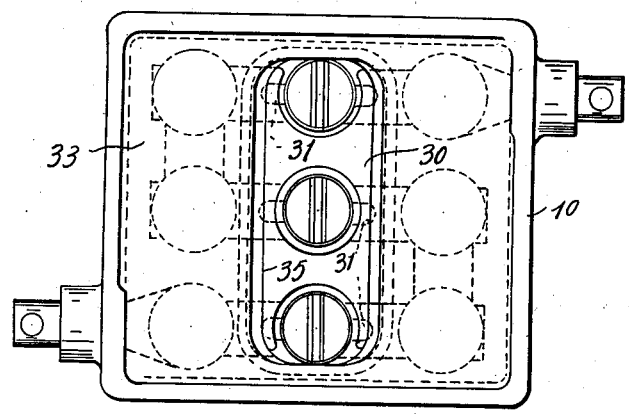
Figure 11:
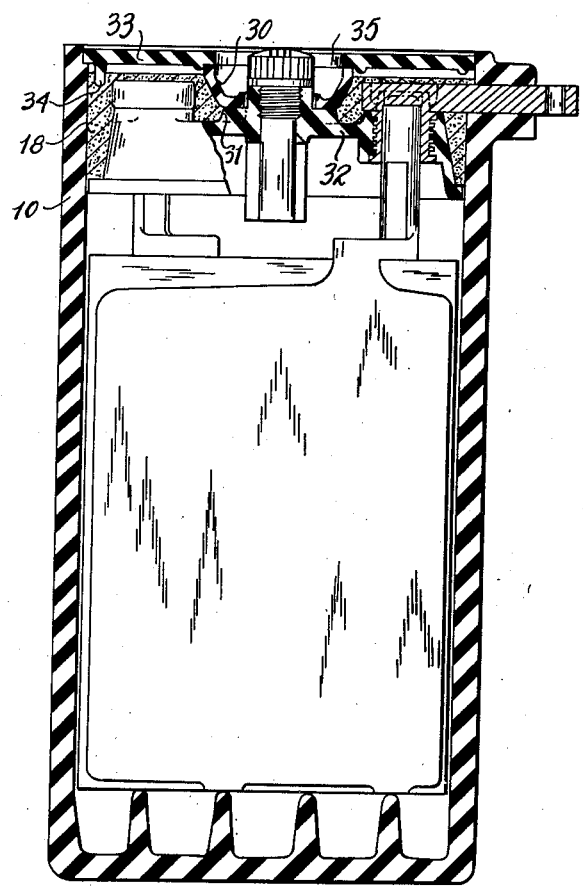

Figs. 8, 9, and 10 are views corresponding to Figs. 1, 2, and 3, but showing a modified construction, the upper portion of the battery only being shown in Figs. 8 and 9; and Figs. 11 and 12 are views corresponding to Figs. 2 and 3 respectively, showing a further modification.

In the drawings I have shown a three-cell battery, but the invention is applicable to a battery having one or any number of cells, but generally is utilized with a multi-cell battery. This battery includes a molded case 10 with partitions 11 forming the cell compartments in each of which is arranged the battery element 12 composed of positive and negative plates with intervening separators. The plates of each polarity are connected together by the usual straps, and from these extend the usual terminal posts 13. The different cells have individual covers 14 which are fitted down into the cell compartments. Covers of well known construction are here illustrated, the same being provided with fairly deep depending skirts with a lower marginal flange which fits closely inside the walls of the cell compartment.

The terminal posts are preferably tightly fitted into or fixed to the covers, and in this instance the covers have sealing sleeves 15 embedded therein forming the terminal post openings, and the terminal posts are lead-burned to the sleeves at the same time that they are lead-burned to the cross-connectors 16 and to the terminal connectors 17, the latter extending horizontally through opposite sides of the case, as shown.

This battery has a depressed top in the sense that the side and end walls of the case extend up above the partitions 11 and above the covers 14, thus forming a receptacle for sealing compound 18 which is supplied when in liquid or semi-liquid form to a sufficient height in the receptacle or open top of the battery to cover the cell covers 14 and the connectors 16 and 17 which are thus embedded in the compound so that short-circuiting, due to electrolyte spilling out of the vent plugs, is avoided.

The cell covers 14 are provided with upstanding venting and filling means preferably kept clear of the sealing compound in the manner hereinafter explained, and consist in this case of upstanding sleeves 19 which are integral with the covers and somewhat longer than in the ordinary battery and which at their upper ends receive vent plugs 20 screwed into place in the usual manner.

In a battery of this kind the sealing compound 18 cannot be relied upon to hold down the cell covers 14 and the battery elements which are attached thereto. To hold down the covers and the battery elements, I employ a holddown frame 21 which preferably extends across the battery centrally thereof, and in this instance has its ends overlapping the top edge of opposite walls of the case 10. This frame, like the cell covers 14, may be formed of hard rubber or other material inert to battery electrolyte, and is preferably in the form of a shallow open top receptacle so as to catch and retain electrolyte which may spill out of the vent plugs, the depression being designated 21a. It is provided in this instance in the bottom wall with openings 21b through which the sleeves 19 of the covers 14 freely extend and with downturned flanges 21c surrounding these openings.

This holddown frame preferably does not directly engage the covers 14, and, in this instance, cushioning means in the form of rubber or other yieldable washers 23 are provided between the covers and the lower ends of the flanges 21c, although a single cushioning member in the form of a single strip extending across the battery over the covers may be used instead of the individual cushioning washers. Not only do these washers 23 or equivalent members serve as a cushion between the holddown frame 21 and the covers, thus minimizing the likelihood of breakage, but they also act as a seal against the leakage of electrolyte from the receptacle 21a formed in the frame 21.

With all forms of the invention herein disclosed, the holddown frame is partially embedded in the sealing compound 18 and is, therefore, placed in position in the top of the battery before the compound is poured into the receptacle or compartment which is provided for receiving the compound.

Figure 6:
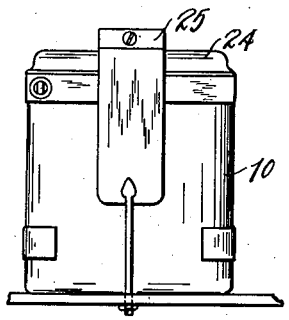
Figs. 6 and 7 are, respectively, a side view and an end view on a reduced scale showing one way in which the battery may be secured in place and the upper cover held down against the top of the battery case.
Figure 7:
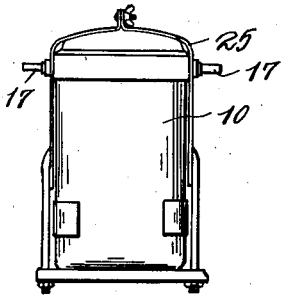

The top of the battery is preferably covered by a one-piece cover 24 which is fitted down over the top edge of the case 10 and preferably engages the ends of the holddown frame 21 so as to retain it tightly against the top of the case. This outer one-piece cover 24 may be held down onto the battery by any convenient means, such as by a holddown strap 25 illustrated in Figs. 6 and 7, or by one or more clamping members pressed down by set-screws or equivalent means carried by a part of the motorcycle or other member or mechanism with which the battery is used.

In Figs. 8, 9 and 10 I have shown a construction wherein the holddown frame and the top cover differ from the corresponding parts of the construction first described. In this instance, the general construction of the battery is substantially the same as that first described, including the case 10 and cell covers 14 with their upstanding vent sleeves 19 and vent plugs 20. In this instance the holddown frame, here designated 26, while being in the form of a hollow, open top receptacle like the holddown frame 21, is more deeply dished than the latter and extends up above the top of the case 10. The lower part of this holddown frame is seated in sealing compound 18, as in the first instance, but, additionally, the lower part thereof has a continuous skirt 26a which extends down into and is embedded in the sealing compound.

A further modification in the holddown frame over that first described resides in the fact that its lower side is so constructed as to subject the cushioning and sealing washers, here designated 27, to lateral as well as vertical pressure. This is accomplished by providing, on the lower side of the holddown frame, wells or depressions 26b which surround the openings through which the vent sleeves 19 extend. These wells receive the upper portions of the washers 27 and confine them, so to speak, so that when the holddown frame is pressed down these washers are compressed both vertically and laterally, as stated above, thus providing the same cushioning effect as in the first instance but a more effective sealing action. The washers are pressed down against upstanding annular shoulders 14a formed on the cover and immediately surrounding the vertical vent sleeves 19.

An additional modification shown in these figures is in the top cover corresponding to the cover 24 of the construction first described. In this instance, the top or upper cover is in two parts including a dished metal cover member 28 preferably made of sheet steel and provided at its perimeter with a flange 28a fitted into a groove extending around the top of the battery case 10, the other part being a centrally disposed so-called filler cover 29 which may be formed of hard rubber or equivalent material. The steel cover 28 has a centrally disposed elongated opening formed in it, which opening is substantially coextensive with the holddown frame 26 and the filler cover closes this opening, as shown in Figs. 8 and 9, so that access may be conveniently had to the vent plugs 20 for filling or testing purposes. The steel cover is slightly depressed around the margin of the opening provided therein forming a flange 28a which fits into a groove extending all around the top of the holddown frame 26 so that the upper cover exerts a downward pressure on the holddown frame on its four sides and ends rather than on its ends only, as in the construction just described. The filler cover 29 fits into the depression formed in the steel cover and engages the flange 28a and the top of the holddown frame.

The two-part cover may be held in position or clamped down on the top of the battery case and holddown frame in either of the ways described in connection with the construction shown in Figs. 1 to 7, or by other suitable means.

While the cushioning and sealing means between the holddown frame and the cover are preferred, I do not regard them essential, and in Figs. 11 and 12 the dished holddown frame 30, which is constructed and arranged substantially like those previously described, is seated upon shoulders 31 of individual cell covers 32. In this instance the holddown frame is pressed down against the shoulders 31 by a top cover 33 which is fitted inside the top of the case 10 and rests upon a shoulder extending around the inner side of the case near the top. The cover 33 may be formed of hard rubber or equivalent material, and it is provided in this instance with a depending skirt 34 which is embedded in the compound 18 adjacent the walls of the case. It is provided also with a centrally disposed elongated opening 35 which is substantially coextensive with the top edge of the holddown frame so as to permit access to the vent plugs. This top cover 33 is generally held in place by a cover member carried by the motorcycle and preferably a pad of rubber or other yieldable material is placed between it and the cover 33 for cushioning purposes.

While I have shown several modifications, I do not desire to be confined to the precise details of construction and arrangement shown but aim in my claims to cover all modifications which do not involve a departure from the spirit and scope of the invention in its broadest aspects.

Having thus described my invention, I claim:

1. A storage battery comprising a case having compartments for a plurality of cells, covers fitted into the cell compartments below the top of the case whereby a compartment is formed for sealing compound, intercell and terminal connectors for the battery, the covers and connectors except the ends of the terminal connectors being covered with sealing compound, the covers being provided with upstanding tubular extensions, a holddown member in the form of an open top receptacle extending crosswise of the cells, said holddown member having openings through which said tubular extensions of the covers project, and an upper auxiliary cover fitted to the top of the case and engaging the holddown member so as to maintain the latter in holddown relation to the different covers.

2. A storage battery comprising a case having compartments for a plurality of cells, covers provided with upstanding tubular extensions fitted into the cell compartments below the top of the case whereby a receptable for sealing compound is formed in the upper part of the case beneath the top thereof, intercell and terminal connectors for the battery, the covers and connectors except the ends of the terminal connectors being covered with sealing compound, a holddown member in the form of a receptacle extending crosswise of the cells provided with openings through which said tubular extensions of the covers project, and an upper auxiliary cover fitted to the top of the case and engaging the holddown member so as to maintain the latter in holddown relation to the covers, said auxiliary cover having an opening substantially coextensive with the holddown member.

3. A storage battery comprising a case having compartments for a plurality of cells, covers provided with upstanding tubular extensions fitted into the cell compartments below the top of the case, intercell and terminal connectors for the battery, the covers and connectors except the ends of the terminal connectors being covered with sealing compound, a holddown member in the form of a receptacle extending crosswise of the cells, said holddown member having openings through which said tubular extensions of the covers project, and an upper auxiliary cover for the case engaging the holddown member so as to maintain the latter in holddown relation to the covers, said auxiliary cover being in two parts one having an opening substantially coextensive with the holddown member and the other closing said opening.

ROBERT M. RANEY.